United States Patent

Louth

[15] 3,654,398

[45] Apr. 4, 1972

[54] DEVICE TO KEEP A CAPSTAN IN PHASE WHEN SWITCHING MODES

[72] Inventor: Kenneth Louth, Menlo Park, Calif.

[73] Assignee: RCA Corporation, New York, N.Y.

[22] Filed: Apr. 3, 1970

[21] Appl. No.: 25,467

[52] U.S. Cl. ..................................179/100.2 B, 179/100.2 T

[51] Int. Cl. ..........................................................G11b 27/08

[58] Field of Search ...............179/100.2 B, 100.2 S, 100.2 T; 340/174.1 B, 174.1 A; 178/6.7 P

[56] References Cited

UNITED STATES PATENTS

| | | | |
|---|---|---|---|
| 3,050,594 | 8/1962 | Bick et al. | 179/100.2 T |
| 3,352,977 | 11/1967 | Sha Shoua | 179/100.2 T |
| 3,175,034 | 3/1965 | Kihara | 179/100.2 T |
| 3,071,644 | 1/1963 | Olive | 179/100.2 T |

*Primary Examiner*—Bernard Konick
*Assistant Examiner*—Jay P. Lucas
*Attorney*—Edward J. Norton

[57] ABSTRACT

A capstan control useful in a recorder reproducer system in the performance of splicing operations, for example. The capstan is controlled for playback and record in response to the error comparison of a tonewheel signal and a selectable one of two other control signals. The control signals are made to be phase correlated to minimize disturbances of the capstan operation when the system is switched between the playback and record modes.

5 Claims, 4 Drawing Figures

INVENTOR.
KENNETH LOUTH
BY James B. Hayes
ATTORNEY

INVENTOR.
KENNETH LOUTH
BY James B. Hayes
ATTORNEY

DEVICE TO KEEP A CAPSTAN IN PHASE WHEN SWITCHING MODES

In television recorder reproducer systems, there are generally two approaches to electronic splicing or editing. One approach is an insert edit or splice, where the original control track of the record medium is continuous throughout the spliced or edited portion of the medium. A second approach is the add-on edit or splice, which presupposes that there is no control track on the medium beyond the point of edit. In an insert splice or edit, the capstan control system is able to continue operation in its playback mode, because the control track information for capstan control is present. Therefore, there is no need for special consideration in providing a transition from the playback to record condition for the capstan. However, where an add-on splice or edit is to performed, consideration must be given to the transition of capstan control from a playback to a record condition to provide proper capstan control. Such a transition from playback to record mode of operation of the capstan must be smooth causing no visible disturbances and enabling continued recording in a manner to meet recording specifications, so that subsequent playback and editing operations are not degraded or voided.

It is therefore an object to provide a control arrangement for effecting optimum capstan control in a recorder reproducer during operating mode transitions.

Briefly there is provided a system for transducing signals with a record medium. The system can include a rotatable headwheel, including means for providing a reference signal indicative of the frequency and phase of the movement of the headwheel. Also provided is a means for transducing from the medium a first control signal having certain frequency and phase characteristics. A capstan servo is responsive to a second control signal for moving the record medium past the headwheel and first control signal transducer. A third control signal is provided from the second control signal. The third signal is made to have substantially the same phase as the first control signal. Circuit means are provided, which are operable in a first mode, to provide the second control signal in response to the frequency and phase difference of the reference and first control signals. The circuit means in a second mode provides the second control signal in response to the frequency and phase difference of the reference and third control signals.

Figure 1:
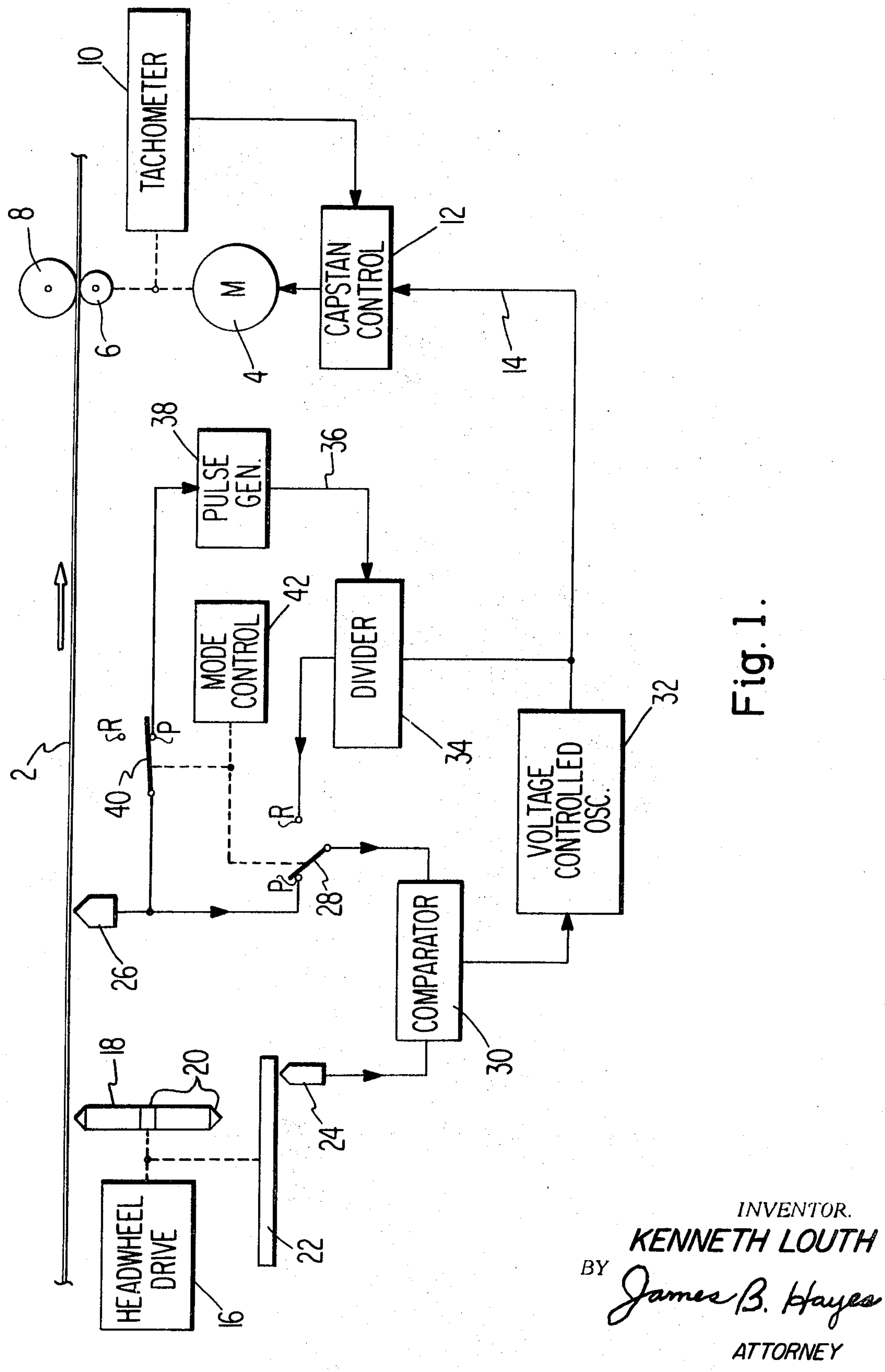
FIG. 1 is a block diagram of an embodiment of the invention.

Referring to FIG. 1 there is shown a recording medium 2 upon which a video signal can be recorded and played back using a transverse scan technique. Also on the medium 2, provision is made in known manner for a control signal at, for example, 240HZ. The structure required to record and reproduce signals, is shown in a greatly simplified manner in FIG. 1. The details of the tape transport are similar to those of equipment now used extensively in the art and, for reasons of simplicity and clarity, are not presented herein.

In FIG. 1, a drive means 4, shown as a motor, is coupled to the capstan 6 for driving the record medium 2, between the capstan 6 and a pinch roller 8, in the direction of the arrow. The drive means 4 is coupled in an electromechanical feedback servo loop, comprising tachometer 10 and capstan control means 12, which act in known manner to provide controlled movement of capstan 6 in response to a signal on lead 14. The record medium 2 may be arranged in an endless loop or suitable supply and takeup reels (not shown) may be provided. A headwheel drive means 16 causes the headwheel 18 to rotate in a plane perpendicular to the direction of the medium 2 movement. The headwheel 18 preferably has a plurality of magnetic heads 20 spaced about the periphery thereof. The magnetic heads 20 engage the record medium 2 in turn, thereby scanning in time sequence across the width of the medium 2.

The headwheel drive 16 also causes a tone wheel 22 to rotate with the headwheel 18. The tone wheel 22 may be constructed of magnetically susceptible material with a notch or aperture therein. Each time the notch passes a pickup device 24, a pulse is generated. In this or a similar manner, a single pulse is generated for each complete revolution of the headwheel 18. For present purposes the drive 16 is assumed to be one which produces a nominal 240 revolution per second of the headwheel 18.

Arranged in transducing relation with the medium 2 is a control track head 26 for transducing, for example, a 240HZ control track signal with respect to the medium 2. The output of control track head 26 is applied, via a contact designated P of switch 28, to a first input of a comparator means 30. A second input to comparator 30 is the tone wheel signal from pick-up device 24. The comparator means 30 is arranged to provide an error signal output indicative of the frequency and phase difference between its inputs. The output of comparator means 30 is applied to and controls the output signal frequency, on lead 14, from a voltage controlled oscillator (VCO) 32. As previously mentioned, the signal on lead 14 is utilized to control the drive of capstan 6 and therefore the movement of the medium 2. In practice, the nominal frequency of the oscillator 32 output is preferably arranged to be a multiple of the nominal frequency of the tone wheel signal from pick-up 24, for example 15,360HZ.

The output of oscillator 32 is fed to a divider means 34. The divider means 34 may be a known type frequency divider whose divide operation is settable or controlled by an input on lead 36. The output of divider means 34 is coupled to a contact designated R of switch 28. The set or control for divider 34 is provided from the output of control track head 26 through contact (P) of switch 40 and pulse generator 38. The pulse generator 38 in response to the control track signal, provides proper pulses to set or control the phase of the output signal of the divider 34 via lead 36. When switch 40 is in the position shown (P), the set or control pulses are applied to divider 34. When switch 40 is in its other position (R), no control signal is provided to generator 38 and, therefore, no set is applied to divider 34.

The switches 28 and 40 are operated from a common mode control means 42. While switches 28 and 40 are shown as mechanical devices, it will be understood that electronic mode control and switching may be utilized.

In the playback mode of operation of the system of FIG. 1 switches 28 and 40 are in the position shown. The error voltage which controls the frequency of the oscillator 32 is derived by comparison of the reproduced control track signal, with a reference signal frequency which is shown as derived from the tone wheel pulses coming from the pick-up head 24. Such a comparison ensures proper capstan drive and tracking of the recording on the tape.

In the record mode of operation, the VCO also controls the speed of the capstan motor. The VCO frequency is made to assume a value by dividing it and comparing the divided VCO ( VCO) with the same tone wheel reference frequency used in playback, previously described. The nominal value of VCO frequency is chosen to be a multiple of nominal tone wheel frequency. For present purposes the VCO frequency is 15,360HZ, the tone wheel frequency is 240HZ and the divider ratio is 64. The tachometer used has 2,000 lines and the capstan diameter is chosen to move the tape at a nominal velocity of 15 in/sec. In this case the capstan diameter is 0.621 in. In another arrangement for example, the capstan diameter is 2.0709 in., the tachometer has 5,000 lines and the VCO is at 11,520HZ with the divider ratio of 48.

More specifically during the playback condition, switch 28 is in the play connection (P) as shown and the control track signal is fed to the comparator 30. In the record condition, switch 28 is in the record connection (R) and the divided VCO signal is fed to the comparator. Because of the previous servo operation during playback, the frequency of the divided VCO and that of the reproduced control track signal will be identical if the tape was recorded on the same machine. What is required for a smooth transition between play and record is that the phase of the divided VCO and that of the control track signal be substantially the same, so that when the switch 28 is moved from play (P) to record (R), the comparator 30 will not notice a change.

When switch 28 is moved from play (P) to record (R), the control track signal being applied to the servo comparator during play is replaced by the divided VCO signal. Although the frequency of the divided VCO signal is identical to that of the control track signal, its phase is not necessarily so. In normal operation, and in existing capstan servo systems, it has not been necessary to be concerned with the relative phases of the control track and divided VCO signals. However for the reasons discussed such relative phase is important.

Figure 2:
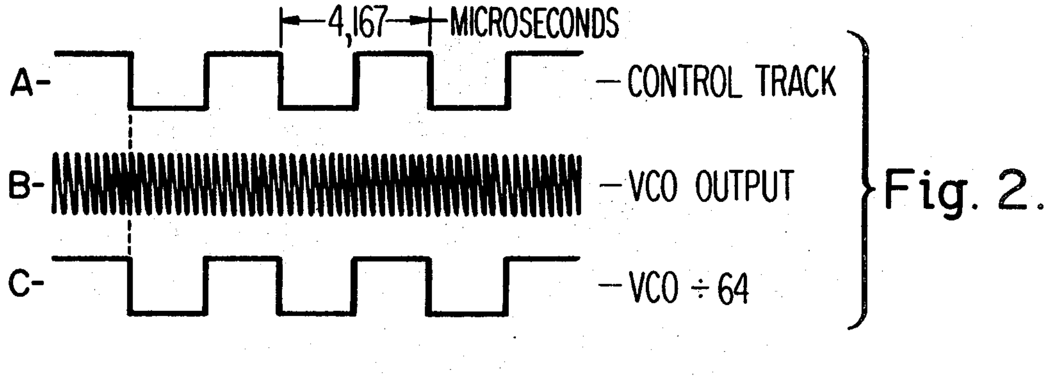
FIGS. 2 and 3 are waveform diagrams useful in understanding the invention.
Figure 3:
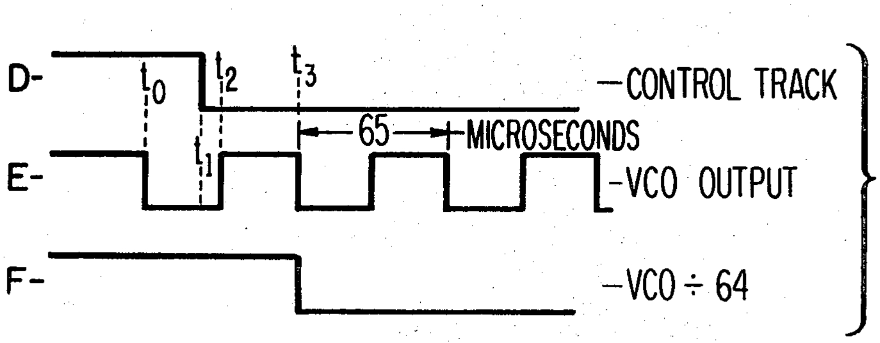

In the arrangement of FIG. 1, the phase of the control track and divided VCO signals are made to match within a small limit of error. This is done by setting the VCO divider 34 with the reproduced control track signal. The amount of phase error is shown by reference to FIG. 2. In FIG. 2, waveform A is the reproduced control track signal, waveform B is the VCO signal and waveform C is the divided VCO signal, as set by the control track signal, A. In the macro-scale of waveforms A, B, and C, the small discrepancy in setting error is not visible. By magnifying the scale by a factor of 4,167 to 65 as illustrated in FIG. 3, the error discrepancy is visible. This is illustrated by waveforms D, E, and F, which show that the control track signals, D, is capable of setting the divider 34 anywhere between time $t_0$ and $t_2$, for example at time $t_1$. The divided VCO output occurs in response to the next edge transition to which the divider 34 is made sensitive. It will be understood through the Figures, that the polarities and transition sensitivity of the arrangement to the waveforms are a matter of desired logic convention adopted and are shown here by way of example. The maximum error which might occur, in phase matching of control track and divided VCO signals, is the time period of the VCO frequency, in this case 65 microseconds. Such a magnitude of error is small compared with the amount of error necessary to notice mistracking. The width of a video track on tape at 15 in/sec. is nominal 0.010 inches. Therefore, the time taken to pass 0.010 in. of tape across a video head is 1/1500 second or 667 microseconds. Thus the maximum phase matching error will cause a mistracking of 65/667 or approximately 10 percent. In the case not illustrated, where the VCO frequency is 11,520HZ., the possible error is 88 microseconds. These errors are reducible by increasing the VCO frequency and dividing it down to drive the capstan servo, as is done for operation of the tape recorder at speeds which are a submultiple of 15 in/sec.

Switch 40 is utilized since it is preferable to disconnect the pulse generator 38 from the divider when in the record condition (R), so that noise or other interfering signals from the control track will not get through to possibly falsely set the divider 34. To further avoid spurious setting of divider 34, the transition of switch 40 to the (R) position is preferably made to slightly precede the transition of switch 28 to its (R) position.

By this arrangement, timing of the divider 34 operation is set in response to the control track signal. This insures substantial phase coherence between the divided VCO output and the control track signal. It should be noted that, once the transition from play to record is accomplished, the capstan servo system is in its normal record condition. Thus the subsequent speed of the capstan motor is controlled, in the same manner as it is in a normal recording done by the system. Thus necessary transitions between play and record modes may be accomplished with minimal disturbance of the operation of the capstan control and hence the operation of the whole recorder reproducer system.

In practice of the invention, it is preferable to avoid possible disturbance of the operation of the comparator 30 of FIG. 1 when switch 28 is operated. Such might occur where before and after the operation of switch 28, a control track and divided VCO pulse are inputed to the comparator 30 within the period between two successive tone wheel pulses.

Figure 4:
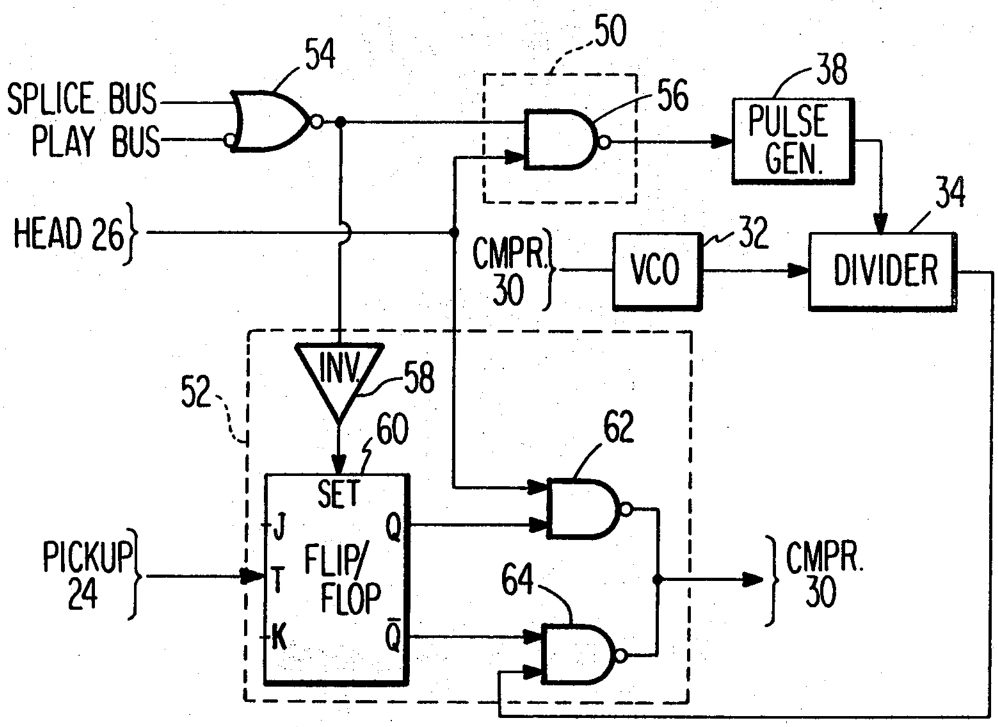
FIG. 4 is a more detailed block diagram of a portion of the embodiment of FIG. 1.

FIG. 4 shows a detailed embodiment of the portion of the arrangement of FIG. 1, in which the occurrence of both a control track and divided VCO pulse within one tone wheel pulse period is prevented. Like numbered items in FIG. 4 correspond with those shown and described in reference to FIG. 1.

In FIG. 4 the elements of dashed lined box 50 donote the switch 40 of FIG. 1. The elements of dashed line box 52 denote the switch 28 of FIG. 1. The gate 54 has inputs coupled to splice and play logic buses and an output forming one input to gate 56. A second input of gate 56 is from the control track head transducer 26. The output of gate 56 is fed through generator 38 to divider 34.

The output of gate 54 is also coupled through inverter 58 to the "set" input of a known type J–K flip flop 60. The trigger input (T) to flip flop 60 is provided from tone wheel pickup means 24. The Q output of flip-flop 60 is coupled as a first input of a gate 62. The second input of gate 62 is from control track head 26. The Q output of flip-flop 60 is coupled as a first input of a gate 64. The second input of gate 64 is from the output of divider 34. The outputs of gates 62 and 64 are coupled as the switched input of comparator means 30.

In normal play condition, the output of gate 54 is high because the play bus is low is high because the play bus is low for its on condition. The splice bus is caused to be off and low by splice timing circuitry not shown. The low condition of the splice bus also keeps the output of gate 54 high. The gate 54 output being high enables gate 56 to pass the control track signal to set the divider 34. The high output of gate 54 is inverted by inverter 58, producing a low signal which keeps flip flop 60 in the set condition. The set condition of flip flop 60 creates a high on its Q output thereby enabling gate 62, so that the control track signal is sent to the comparator 30. Gate 64 is disabled by the low output from $\overline{Q}$ of flip flop 60 and the divided VCO pulses are prevented from getting through to comparator 30.

When the record mode is made present to perform a splice recording, the play bus is thereby turned high and off and the splice bus is caused to go high and on. When both the play bus and splice bus are high, the output of gate 54 becomes low. Thus gate 56 is disabled, preventing further setting of the divider 34. Simultaneously, the output of inverter 58 is made high, releasing the set input of flip flop 60. Flip flop 60 is thereby made receptive to the next pulse at its trigger (T) input. The J and K inputs of flip flop 60 are arranged so that a trigger pulse will reset the flip flop 60, and it will remain reset until set again by a low from the output of inverter 58. When flip flop 60 is in reset condition, gate 62 is disabled and gate 64 is enabled and the divided VCO pulses, rather than the control track signal, are passed through to the comparator 30. Since the flip flop 60 and hence gates 62 and 64 are controlled by the timing of the tone wheel pulses, the possibility of occurrence of both the control track and divided VCO pulse during one tone wheel period is eliminated.

While the above description has been given in connection with a transverse scan recorder-reproducer, by way of example, the capstan control is useable as well in other types of recorder reproducer systems, for example, helical scan systems.

What is claimed is:

1. In a system for transducing signals on a record medium the combination comprising:

rotatable headwheel means including means for providing a reference signal indicative of the frequency and phase of said headwheel movement;

second means for transducing from said record medium a first control signal having frequency and phase characteristics;

capstan servo means responsive to a second control signal for moving said record medium past said headwheel means and said second means;

means for providing from said second control signal a third control signal having substantially the phase of said first control signal; and fifth means operable in a first condition thereof to provide to said capstan servo means said second control signal in response to the frequency and phase difference of said reference signal and said first control signal and in a second condition thereof for providing said second control signal in response to the frequency and phase difference of said reference signal and said third control signal.

2. In a recorder reproducer system having capstan drive means for moving a record medium past a rotatable headwheel, said headwheel including means for providing a reference signal indicative of the movement of said headwheel, said system further including means for transducing from said record medium a control signal having frequency and phase characteristics, the combination comprising;

comparing means having first and second inputs and an output;

means for applying said reference signal to one input of said comparing means;

means including switching means in a first condition thereof for applying said control signal to the second input of said comparing means;

means for applying to said drive means a second control signal having a frequency in response to the output of said comparing means;

frequency altering means responsive to said second control signal for providing a third control signal to said second comparing means input through said switching means in a second condition thereof; and means for controlling said frequency altering means in response to said first control signal to provide said third control signal with a frequency and phase substantially equal to that of said first control signal.

3. The invention according to claim 2 wherein said means for controlling said frequency altering means includes further switching means for disabling the control to said frequency altering means when said first switching means is in said second condition.

4. The invention according to claim 2 wherein said frequency altering means includes settable frequency divider means whose output signal phase is controllable by a set signal input to said divider means in accordance with said first control signal.

5. In a recorder reproducer system having capstan drive means for moving a record medium past a rotatable headwheel, including means for providing a reference signal having a frequency and phase indicative of the movement of said headwheel, said system including means for transducing from said medium a control signal having frequency and phase characteristics, the combination comprising:

fourth means for generating a second control signal in response to an error signal;

capstan control means responsive to said second control signal for controlling the movement of said medium;

fifth means for generating said error signal in response to frequency and phase differences between said reference signal and a further signal;

sixth means coupled to the output of said fourth means and responsive to said first control signal for providing a fifth signal having a frequency and phase correlated to said first control signal; and means for selectively applying one of said first control signal and said fifth signal as said further signal to said fifth means in accordance with the occurence of said reference signal.

* * * * *

UNITED STATES PATENT OFFICE
CERTIFICATE OF CORRECTION

Patent No. 3,654,398 Dated April 4, 1972

Inventor(s) Kenneth Louth

It is certified that error appears in the above-identified patent and that said Letters Patent are hereby corrected as shown below:

Column 2, Line 54 - "head" should be deleted

Column 2, Line 59 - "(VCO)" should be --(÷VCO)--

Column 3, Line 35 - "through" should be --throughout--

Column 4, Line 24 - "Q" should be -- $\overline{Q}$ --

Column 4, Line 29 - after "low" delete "is high because the play bus is low"

Signed and sealed this 19th day of September 1972.

(SEAL)
Attest:

EDWARD M.FLETCHER,JR.
Attesting Officer

ROBERT GOTTSCHALK
Commissioner of Patents